(12) United States Patent
Gust et al.

(10) Patent No.: US 9,557,750 B2
(45) Date of Patent: Jan. 31, 2017

(54) CLOUD BASED BUILDING AUTOMATION SYSTEMS

(71) Applicant: AAF-McQuay Inc., Minneapolis, MN (US)

(72) Inventors: Michael J. Gust, Stillwater, MN (US); John Suzukida, Shoreview, MN (US)

(73) Assignee: Daikin Applied Americas Inc., Minneapolis, MN (US)

( * ) Notice: Subject to any disclaimer, the term of this patent is extended or adjusted under 35 U.S.C. 154(b) by 427 days.

(21) Appl. No.: 13/828,133

(22) Filed: Mar. 14, 2013

(65) Prior Publication Data

US 2013/0310986 A1    Nov. 21, 2013

Related U.S. Application Data

(60) Provisional application No. 61/647,350, filed on May 15, 2012.

(51) Int. Cl.
  *G05D 23/19*  (2006.01)
  *G05B 19/042*  (2006.01)
  *F24F 11/00*  (2006.01)

(52) U.S. Cl.
  CPC ............. *G05D 23/19* (2013.01); *F24F 11/006* (2013.01); *F24F 11/0012* (2013.01);
  (Continued)

(58) Field of Classification Search
  CPC  F24F 11/0008; F24F 11/0015; F24F 13/1426; F24F 2011/0061; F24F 2011/0064; F24F 2011/0071; F24F 2011/0073; F24F 2011/0075; F24F 2011/0091; F24F 11/0012; G05B 13/02; G05B 15/02; G05B 19/042; G05B 2219/23043; G05B 2219/25168; G05B 2219/2642;
  G05D 22/02; G05D 23/19; G05D 23/1904; G05D 23/1917; G05D 23/1919; G05D 23/1927; G05D 27/02; H04L 12/2803; H04L 12/282; H04L 12/2827; H04L 2012/2841; Y02B 60/50; Y02B 70/3216; Y02B 70/3241; Y02B 70/325; Y02B 90/2638; Y04S 10/40; Y04S 20/221; Y04S 20/227; Y04S 20/228; Y04S 40/124; Y04S 10/30
  (Continued)

(56) References Cited

U.S. PATENT DOCUMENTS 4,212,078 A * 7/1980 Games et al. ............... 700/2
6,349,883 B1 * 2/2002 Simmons et al. .......... 236/46 R
(Continued)

FOREIGN PATENT DOCUMENTS

EP  2 012 288 A2  1/2009
EP  2 264 374 A1  12/2010
(Continued)

OTHER PUBLICATIONS

International Preliminary Report on Patentability from PCT Application PCT/US2013/039723, dated Nov. 27, 2014, 7 pgs.
(Continued)

*Primary Examiner* — Crystal J Barnes-Bullock
(74) *Attorney, Agent, or Firm* — Patterson Thuente Pedersen, P.A.

(57) ABSTRACT

A control system for operating the HVAC systems within a building to control the environmental conditions within a building having an onsite component networked to a remote offsite component. The onsite component monitors the conditions within the building and operates the HVAC systems, while the offsite component can be used by the system provider to communicate updates to the onsite component and monitor the effectiveness of the control algorithms used (Continued)

to operate the HVAC systems. The invention includes the method of providing tailored HVAC related controls, reports, notices and diagnostic services to a client under various subscription plans.

9 Claims, 1 Drawing Sheet

(52) U.S. Cl.
CPC ....... *G05B 19/042* (2013.01); *G05D 23/1905* (2013.01); *F24F 2011/0067* (2013.01); *F24F 2011/0071* (2013.01); *F24F 2011/0075* (2013.01); *G05B 2219/25168* (2013.01); *G05B 2219/2642* (2013.01); *Y02B 70/3241* (2013.01); *Y04S 10/30* (2013.01); *Y04S 20/227* (2013.01)

(58) Field of Classification Search
USPC ......... 700/2, 19, 20, 22, 275–278, 286, 291, 700/299; 165/200, 201, 205, 209; 236/46 R, 51
See application file for complete search history.

(56) References Cited

U.S. PATENT DOCUMENTS

| | | | | |
|---|---|---|---|---|
| 7,135,956 | B2* | 11/2006 | Bartone | H02J 3/14 340/3.9 |
| 7,565,225 | B2* | 7/2009 | Dushane et al. | 700/276 |
| 7,621,140 | B2* | 11/2009 | Schnell | F24D 12/02 236/1 C |
| 7,894,944 | B2* | 2/2011 | Liu | G06F 1/206 700/17 |
| 8,374,725 | B1* | 2/2013 | Ols | 700/277 |
| 8,645,495 | B2* | 2/2014 | Johnson | G05B 15/02 700/276 |
| 8,651,168 | B2* | 2/2014 | Thomas | B22D 11/066 164/452 |
| 8,788,097 | B2* | 7/2014 | Drees et al. | 700/275 |
| 2006/0161270 | A1* | 7/2006 | Luskin et al. | 700/22 |
| 2009/0057425 | A1 | 3/2009 | Sullivan et al. | |
| 2009/0057429 | A1 | 3/2009 | Kim et al. | |
| 2011/0047052 | A1* | 2/2011 | Cornish | B60L 11/1861 705/30 |
| 2011/0231320 | A1* | 9/2011 | Irving | G06Q 30/00 705/80 |
| 2011/0304645 | A1* | 12/2011 | Milenkovic | G06Q 10/06 345/619 |
| 2012/0253527 | A1* | 10/2012 | Hietala | G05B 17/02 700/278 |
| 2013/0073094 | A1* | 3/2013 | Knapton et al. | 700/278 |
| 2013/0282181 | A1* | 10/2013 | Lu | H02J 3/14 700/275 |
| 2013/0338839 | A1* | 12/2013 | Rogers et al. | 700/278 |
| 2014/0052300 | A1* | 2/2014 | Matsuoka et al. | 700/276 |
| 2014/0173289 | A1* | 6/2014 | Casilli | 713/185 |
| 2014/0207281 | A1* | 7/2014 | Angle | H04L 12/282 700/257 |
| 2014/0371921 | A1* | 12/2014 | Weaver | H02J 3/14 700/276 |

FOREIGN PATENT DOCUMENTS

| | | |
|---|---|---|
| JP | 2003021380 | 1/2003 |
| JP | 2004245556 | 9/2004 |
| JP | 2009009414 | 1/2009 |
| JP | 2010127542 | 6/2010 |
| WO | WO 2011/028889 | 3/2011 |

OTHER PUBLICATIONS

International Search Report and Written Opinion for PCT Application PCT/US2013/039723, dated Sep. 17, 2013, 10 pgs.
Extended European Search Report for Application No. 13790268.0, mailed Jul. 13, 2016 (6 pgs).

* cited by examiner

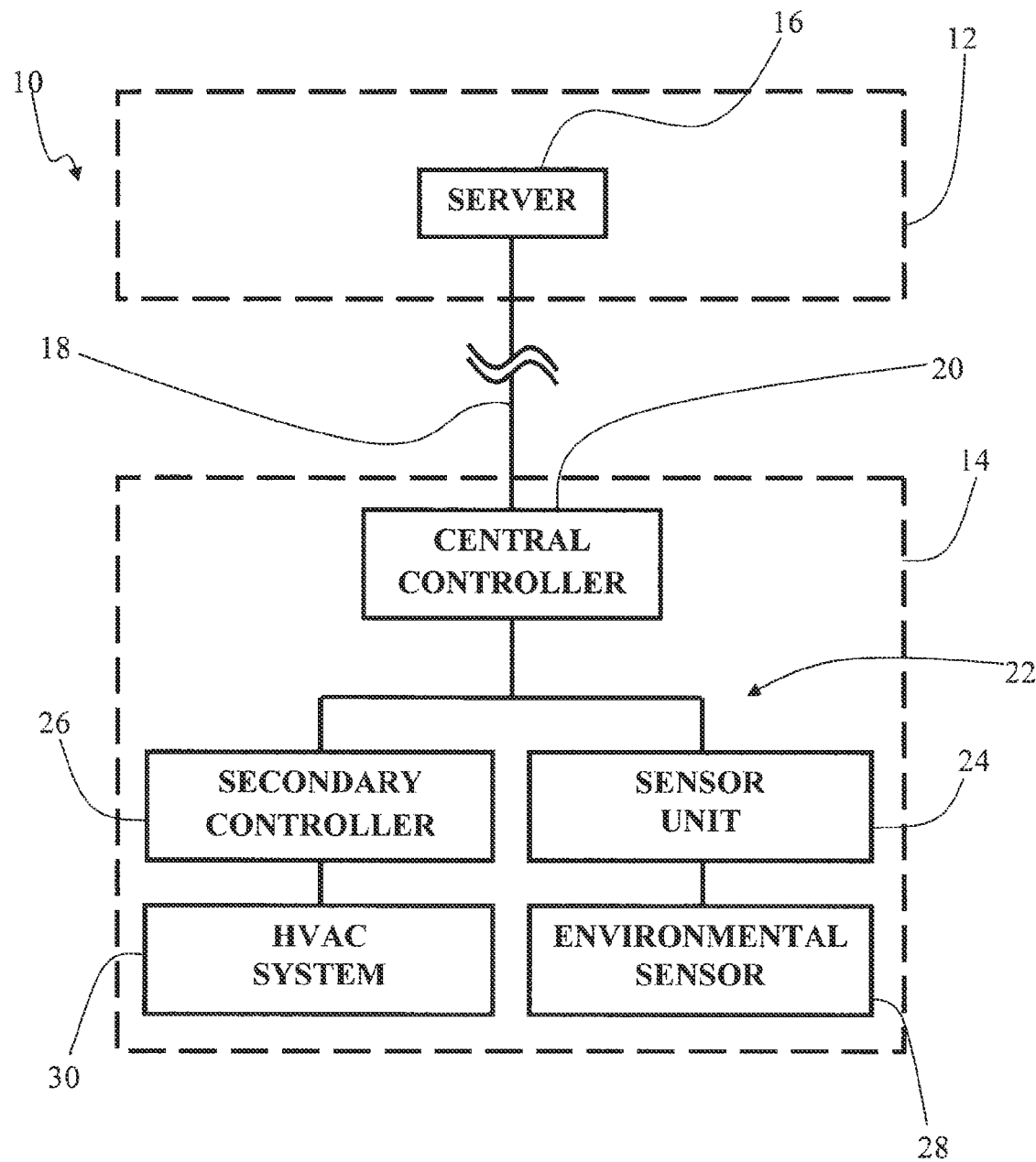

CLOUD BASED BUILDING AUTOMATION SYSTEMS

RELATED APPLICATION

The present application claims priority to U.S. Provisional Application No. 61/647,350 entitled CLOUD BASED BUILDING AUTOMATION SYSTEMS and filed May 15, 2012, which is hereby incorporated herein in its entirety by reference.

FIELD OF THE INVENTION

The present invention is generally related to control systems for operation heating, ventilation and air conditioning ("HVAC") systems based on monitored environmental conditions within the building. More specifically, the present invention is directed to a central control system for HVAC systems having stored control algorithms for operating the HVAC systems and linkable to a cloud for receiving updated control algorithms.

BACKGROUND OF THE INVENTION

Automated HVAC systems maintain environmental conditions within a building by monitoring environmental conditions within a building and adjusting operation of the HVAC systems accordingly. Typically, environmental conditions measured by sensors or thermostats positioned throughout the building are collected at a central controller, which calculates the appropriate operating instructions for the HVAC systems based on stored control algorithms. As HVAC systems are often highly energy intensive to operate, the control algorithms are typically designed to operate the HVAC systems to minimally achieve the desired environmental conditions so as to minimize the amount energy consumed.

The inherent challenge of designing control algorithms for HVAC systems is that each building is unique requiring different operating parameters for the HVAC systems. Constant factors such as building dimensions and internal structures can vary the appropriate operating parameters for the HVAC system. Similarly, variable factors such as the daily weather, changing seasonal conditions and varying throughput of people through the building can change the appropriate operating parameters. As a result, control algorithms that can optimally operate the HVAC systems of a first building may less efficiently operate the HVAC systems of a second building. An optimized control algorithm optimized for a building can become inadequate as the building conditions change over time.

Although the control algorithms can be modified to increase the efficiency of the control system, the implementation process for updating the control algorithms is typically tedious and time consuming. In order to correctly modify the control algorithm, the modifications must be implemented onsite and continually monitored until the system reaches a steady state to determine if the modifications are effective. The large number of factors affecting the operation of the HVAC systems typically requires that the modifications be monitored for an extended period of time to ensure that the modifications address or mitigate as many factors as possible. The onsite modification and extended monitoring is inefficient and can take a substantial amount of time to perform correctly. Moreover, changing conditions in or around the building can render the modifications moot.

As energy costs rise, there is a need for ensuring that the central controller is operating the HVAC system at the maximum possible efficiency. As such, there is substantial need for means of reducing the tedious modification process to maintain the HVAC systems operating at maximizing efficiency

SUMMARY OF THE INVENTION

The present invention is directed to a control system for operating HVAC systems within a building to control the environmental conditions within a building and related method of operating. The control system comprises at least one onsite component installed at each building to be controlled and an offsite component networked to each onsite component. The onsite component monitors the conditions within the building and directly operates the HVAC systems, while the offsite component can be used by the system provider to communicate updates to the onsite component and remotely monitor the effectiveness of the control algorithms used to operate the HVAC systems. Accordingly, the system provider can remotely push control algorithm modifications to the onsite component and remotely monitor the effectiveness of the color algorithm modifications. The offsite component comprises at least one offsite server accessible by the system provider for remotely updating the control algorithms and monitoring the conditions within the building. Similarly, the location of the offsite component allows the service provider to provide subscription services such as regular updates or monitoring of the onsite component to monitor the efficacy of the control algorithms.

Each onsite component comprises a central controller and a plurality of secondary units wirelessly linked to the central controller. The secondary units can include at least one sensor unit comprising a sensor or thermostat for collecting and transmitting information on the current conditions in the building. The secondary units can also comprise at least one secondary controller linked to an HVAC unit for receiving command instructions from the central controller and transmitting information on the current operating conditions of the HVAC unit.

In one embodiment of the present invention, the offsite component comprises a server for receiving and storing control algorithms. The offsite server can be positioned at the service provider allowing the service provider to easily upload new control algorithms and modify existing algorithms stored on the memory component. In this configuration, the building information and the operating conditions can be gathered by the secondary units and transmitted to the central controller. The central controller aggregates the data and retransmits the data to the offsite server. The transmitted data can be processed at the offsite server to create a set of operating instructions for the HVAC systems at the building that are transmitted back to the central controller, which distributes the operating instructions to the appropriate secondary unit.

Storing the control algorithms at the service provider allows for easy access for the service provider to the control algorithms to make modifications to the algorithms without having to make the changes onsite at the building. The offsite server can be linked to a plurality of onsite components at a plurality of buildings. In certain aspects, global modifications to the control algorithms stored at the central server can be quickly made at the offsite server, rather than requiring trips to each building to apply the modifications at each onsite component.

In another embodiment, the control algorithms are stored on site at each onsite component rather than at the offsite server. In this configuration, the offsite server can be accessed by the service provider to remotely transmit modifications to the onsite component of each controlled building. Similarly, the onsite component can be configured to regularly upload the building information to the offsite server for monitoring by the service provider to ascertain the effectiveness of the control algorithms and whether any modifications to the algorithms are necessary.

A method of maintaining environmental conditions within a building, according to an embodiment of the present invention, comprises providing an offsite component networked to an onsite component, wherein the onsite component comprises a central controller wirelessly linking at least one sensor unit and at least one secondary controller linked to an HVAC system. The method further comprises storing at least one control algorithm on the central controller. The method also comprises gathering at least one measurement of environmental conditions within the building and transmitting the measurement to the central controller. The method further comprises processing the measurement through the central controller to generate at least one control instruction for operating the HVAC system. The method also comprises transmitting the instructions from the central controller to the secondary controller to operate the HVAC system according to the control instructions. Finally, the method comprises transmitting at least one programming modification from the offsite component to the central controller and modifying the control algorithm according to the programming modification.

A method of maintaining environmental conditions within a building, according to an embodiment of the present invention, comprises providing an offsite component networked to an onsite component, wherein the onsite component comprises a central controller wirelessly linking at least one sensor unit and at least one secondary controller linked to an HVAC system. The method further comprises storing at least one control algorithm on the offsite component. The method also comprises gathering at least one measurement of environmental conditions within the building and transmitting the measurement to the central controller. The method further comprises transmitting the measurement from the central controller to the offsite component and processing the measurement at the offsite component to generate at least one control instruction for operating the HVAC system. The method also comprises transmitting the instructions from the offsite component to the central controller, wherein the central controller distributes the control instruction to the secondary controller to operate the HVAC system according to the control instructions. Finally, the method comprises modifying the control algorithm at the offsite component to alter operation of the HVAC system at the onsite component.

A method of providing an energy optimization plan for a building energy management system is also disclosed. Instead of selling hardware and installing into a building, a subscription service is proposed to provide a hardware and software optimization system. By utilizing artificial intelligence and fuzzy logic, the proposed method will continually learn to minimize total energy usage based on each building's unique and changing characteristics. By placing the software platform on the cloud, onsite requirements are reduced. Existing locations can be retrofitted with specially designed wireless controllers. New systems can be done at less cost by leveraging the wireless capabilities and placing controls outside of the structure on the cloud. The structure would only require a minimum level of internal control in case of a loss of communication. Multiple levels of service can be provided including: scheduler; alarm handler; dynamic graphics; notification of events; trending; user account information; report generator; energy optimization algorithm, diagnostic capabilities and service tools. The method includes allowing the user to choose from a menu of options that would be provided under a subscription plan.

The above summary of the various representative embodiments of the invention is not intended to describe each illustrated embodiment or every implementation of the invention. Rather, the embodiments are chosen and described so that others skilled in the art can appreciate and understand the principles and practices of the invention. The FIGURE in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which:

FIG. 1 is a schematic diagram of a control system according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

As shown in FIG. 1, a control system 10 for controlling environmental conditions within at least one building, according to an embodiment of the present invention, comprises an offsite component 12 and at least one onsite component 14. The offsite component 12 may include what is generically known as cloud computing. The offsite component 12 operates as a remote terminal for directly accessing the onsite component 14. The offsite component 12 comprises at least one server 16 for storing and processing information. The offsite component 12 is positioned at a site remote to each building to be controlled and is linked to the onsite component 14 at each building via a network connection 18. The network connection 18 can comprise, but is not limited to, hard line and wireless telecommunication means. The network connection 18 can be used to remotely monitor the building conditions and communicate system updates to the onsite component 12. In certain aspects, a single offsite component 12 can be networked to a plurality of onsite components 14. Alternatively, a plurality of offsite components 12 can each be linked to a single onsite component 14, wherein the offsite components 12 are positioned at the same location for convenient access to each single onsite component 14.

The onsite component 14 comprises a central controller 20 and a plurality of secondary units 22. The plurality of secondary units 22 can further comprise at least one sensor unit 24 and at least one secondary controller 26. Each sensor unit 24 is operably linked to environmental sensor 28 including, but not limited to, a thermometer, a humidity sensor, and a barometer. The environmental sensor 28 collects measurements on the current environmental conditions within the building. Similarly, each secondary controller 26 is operable linked to an HVAC system 30 and is adapted to control the operation of the HVAC system 30 according to at least one control instruction. Each secondary unit 22 is linked to the central controller 20 via a wireless connection 32 allowing for wireless transmission of information between the secondary units and central controller 20. The wireless connection 32 can comprise radio, BLUETOOTH, Wi-Fi or other conventional wireless technology. As the secondary units 22 wirelessly communicate with the central controller 20, the central controller 20 and secondary units 22 are modular and can be replaced or updated independently of the rest of the onsite component 14.

In one aspect, at least one control algorithm for generating control instructions based on the current environmental conditions within the building can be stored on the central controller 20. In this configuration, the environmental sensor 28 can collect at least one environmental measurement indicative of the current environmental conditions within the building. The environmental measurement can be transmitted to the central controller 20 via the sensor unit 24. The central controller 20 can process the environmental measurement with the control algorithm to produce at least one control instruction that is transmitted to the appropriate secondary controller 26 for operation of the HVAC system 30. The environmental sensor 28 can then collect additional environmental measurements to evaluate the effectiveness of the control algorithms. Through fuzzy logic/artificial intelligence processes, the controller 20 can improve efficiencies over time as the controller 20 "learns" the characteristics of the structure.

In this configuration, the environmental measurements can be transmitted to the offsite component 12 via the network connection 18 and stored on the server 16 for long-term monitoring of the building. A system provider can access the environmental measurements to ascertain the effectiveness of the control algorithms and determine if the control algorithms need to be modified. Any modifications can be transmitted from the servers 16 to the central controller 20 via the network connection 18 to modify the control algorithms stored on the central controller 20. In one aspect, the modification process can be iterative where multiple cycles of evaluation and modification are performed to reach the desired efficiency.

In one aspect, the control algorithm can be stored on the server 16 instead of the central controller 20. In this configuration, the measurements collected by the environmental sensors 28 are gathered by the central controller 20 and transmitted to the server 16 via the network connection 18 for processing. Once the control instructions are generated, the server 16 transmits the instructions back to the central controller 20, which distributes the instructions to the appropriate secondary controller 26. The system provider can modify the control algorithms directly at the server 16 to improve the effectiveness of the algorithms. In this configuration, back up control algorithms can be implemented on the central controller 20 for maintaining operation of the onsite component 14 in the event that the network connection 18 to the server 16 is lost.

A method of maintaining environmental conditions within a building, according to an embodiment of the present invention, comprises providing a control system 10 comprising an offsite component 12 networked to an onsite component 14, wherein the onsite component 14 comprises a central controller 20 wirelessly linking at least one sensor unit 24 and at least one secondary controller 26 linked to an HVAC system 30. The method further comprises implementing at least one control algorithm on the central controller 20. The method also comprises gathering at least one measurement of environmental conditions within the building with the sensor unit 24 and transmitting the measurement to the central controller 20. The method further comprises processing the measurement through the central controller 20 to generate at least one control instruction for operating the HVAC system 30. The method also comprises transmitting the instructions from the central controller 20 to the secondary controller 26 to operate the HVAC system 30 according to the control instructions. Finally, the method comprises transmitting at least one programming modification from the offsite component 14 to the central controller 20 and modifying the control algorithm stored on the central controller 20 with the transmitted programming modification.

A method of providing building automation/energy management service by way of wireless communication to cloud servers is also provided herein. Such a method may be by annual fee or through a subscription service. Environmental conditions within a building, according to an embodiment of the present invention, comprises providing an offsite component 12 networked to an onsite component 14, wherein the onsite component 14 comprises a central controller 20 wirelessly linking at least one sensor unit 24 and at least one secondary controller 26 linked to an HVAC system 30. The method further comprises storing at least one control algorithm on the offsite component 12. The method also comprises gathering at least one measurement of environmental conditions within the building with the sensor unit 24 and transmitting the measurement to the central controller 20. The method further comprises transmitting the measurement from the central controller 20 to the offsite component 12 and processing the measurement at the offsite component 12 to generate at least one control instruction for operating the HVAC system 30. The method also comprises transmitting the instructions from the offsite component 12 to the central controller 20, wherein the central controller 20 distributes the control instruction to the secondary controller 26 to operate the HVAC system 30 according to the control instructions. Finally, the method comprises modifying the control algorithm at the offsite component 12 to alter operation of the HVAC system 30 at the onsite component 14. Services provided maybe tailored to individual users as required. For example, basic services could be provided in one package while advanced control services utilizing artificial intelligence in another package.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A control system for controlling the environmental conditions within a building comprising:
   at least one onsite component located at the building and further comprising:
      a central controller that stores a control algorithm,
      at least one sensor unit for collecting at least one environmental measurement corresponding to a measured temperature condition from within the building and transmitting the environmental measurement to the central controller, wherein the central controller automatically aggregates the environmental measurements and generates an environmental control instruction based on the environmental measurement, at least one secondary control unit operably linked to an HVAC system, an offsite component located remotely from the building and networked to the at least one onsite component, wherein the offsite component evaluates characteristics of the environmental control instruction to determine an effectiveness of the control algorithm, and wherein the offsite component remotely modifies at least one operating instruction of the control algorithm to generate a new temperature setpoint; and wherein regular updates and monitoring of the at least one onsite component are offered through a subscription service to monitor the efficacy of the control algorithm and wherein the central controller transmits the at least one operating instruction to the secondary control unit governing operation of the HVAC system to achieve a desired environmental condition within the building.

2. The control system of claim 1, wherein the control algorithm for calculating the operating instruction based on the environmental measurement is stored on the central controller.

3. A method of controlling the environmental conditions within a building, comprising:

providing an onsite component at the building and comprising a central controller that stores a control algorithm, a sensor unit and a secondary control unit operably linked to an HVAC system;

networking an offsite component to the onsite component, wherein the offsite component is remote from onsite component;

collecting an environmental measurement within the building with the sensor unit, wherein the environmental measurement corresponds to a measured temperature condition;

wirelessly transmitting the environmental measurement to the central controller;

aggregating the environmental measurements;

generating an environmental temperature control instruction based on the environmental measurement;

wirelessly transmitting a control instruction to the secondary control unit, wherein the control instruction corresponds to the environmental measurement;

operating the HVAC system according to the control instruction;

remotely modifying the control instruction via the offsite component to generate a new temperature setpoint based on an analysis of the building temperature data to maintain a desired efficiency level; and providing regular updates and monitoring of the onsite component through a subscription service to monitor the efficacy of the control algorithm.

4. The method of claim 3, further comprising:

storing a control algorithm on the central controller; and calculating the control instruction based on an analysis of the aggregation of the environmental measurements from within the building.

5. The method of claim 4, further comprising:

transmitting a modifying instruction from the offsite component to alter the control algorithm stored on the central controller to create a modified control algorithm.

6. The method of claim 3, further comprising:

storing a control algorithm on the offsite component;

transmitting the environmental measurement from the offsite component;

calculating the control instruction based on the environmental measurement; and transmitting the control instruction from the offsite component to the onsite component.

7. The method of claim 6, further comprising:

modifying the instruction on the offsite component to alter the control algorithm stored on the offsite component to create a modified control algorithm.

8. The method of claim 3, further comprising:

providing a second onsite component at a second building and comprising a central controller, a sensor unit and a secondary control unit operably linked to an HVAC system; and networking the offsite component to the onsite component, wherein the offsite component is remote from the second onsite component.

9. The method of claim 8, further comprising:

remotely modifying a control instruction transmitted by the second central controller via the offsite component.

* * * * *

UNITED STATES PATENT AND TRADEMARK OFFICE
CERTIFICATE OF CORRECTION

PATENT NO. : 9,557,750 B2
APPLICATION NO. : 13/828133
DATED : January 31, 2017
INVENTOR(S) : Michael J. Gust et al.

It is certified that error appears in the above-identified patent and that said Letters Patent is hereby corrected as shown below:

In the Specification

<u>Column 1, Line 37:</u>
Insert --of-- between the words "amount" and "energy".

<u>Column 2, Line 25:</u>
Delete "color" and insert --control--.

<u>Column 5, Line 3:</u>
Delete "operable" and insert --operably--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*